(No Model.) 3 Sheets—Sheet 1.

C. W. KENNEDY & H. GROSWITH.
SECONDARY BATTERY.

No. 441,958. Patented Dec. 2, 1890.

WITNESSES:

INVENTORS:
Charles W. Kennedy
Henry Groswith
Attorneys

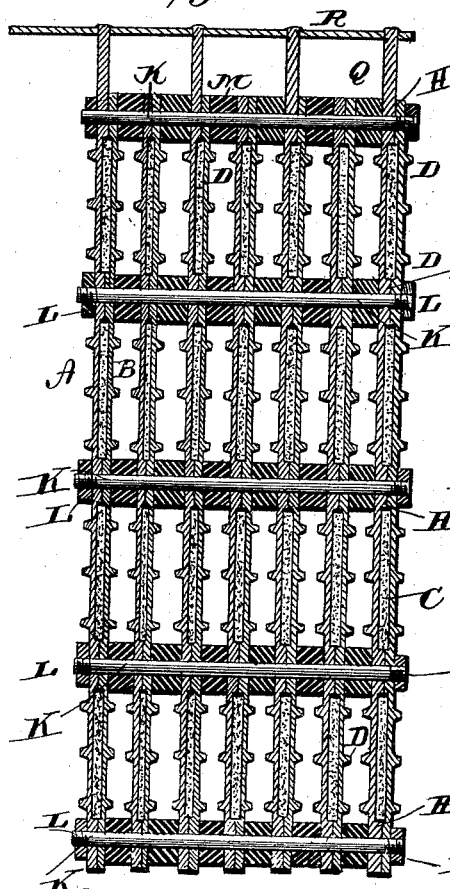
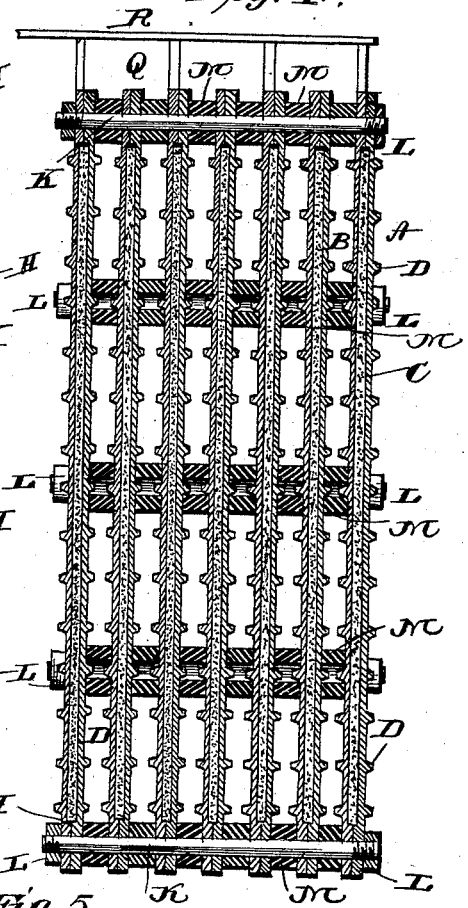
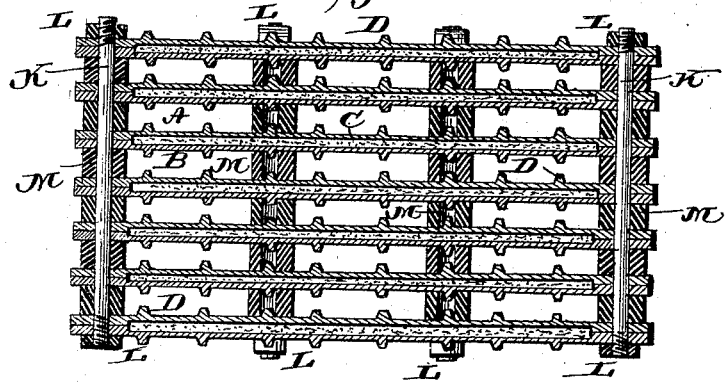

(No Model.) 3 Sheets—Sheet 3.
C. W. KENNEDY & H. GROSWITH.
SECONDARY BATTERY.
No. 441,958. Patented Dec. 2, 1890.
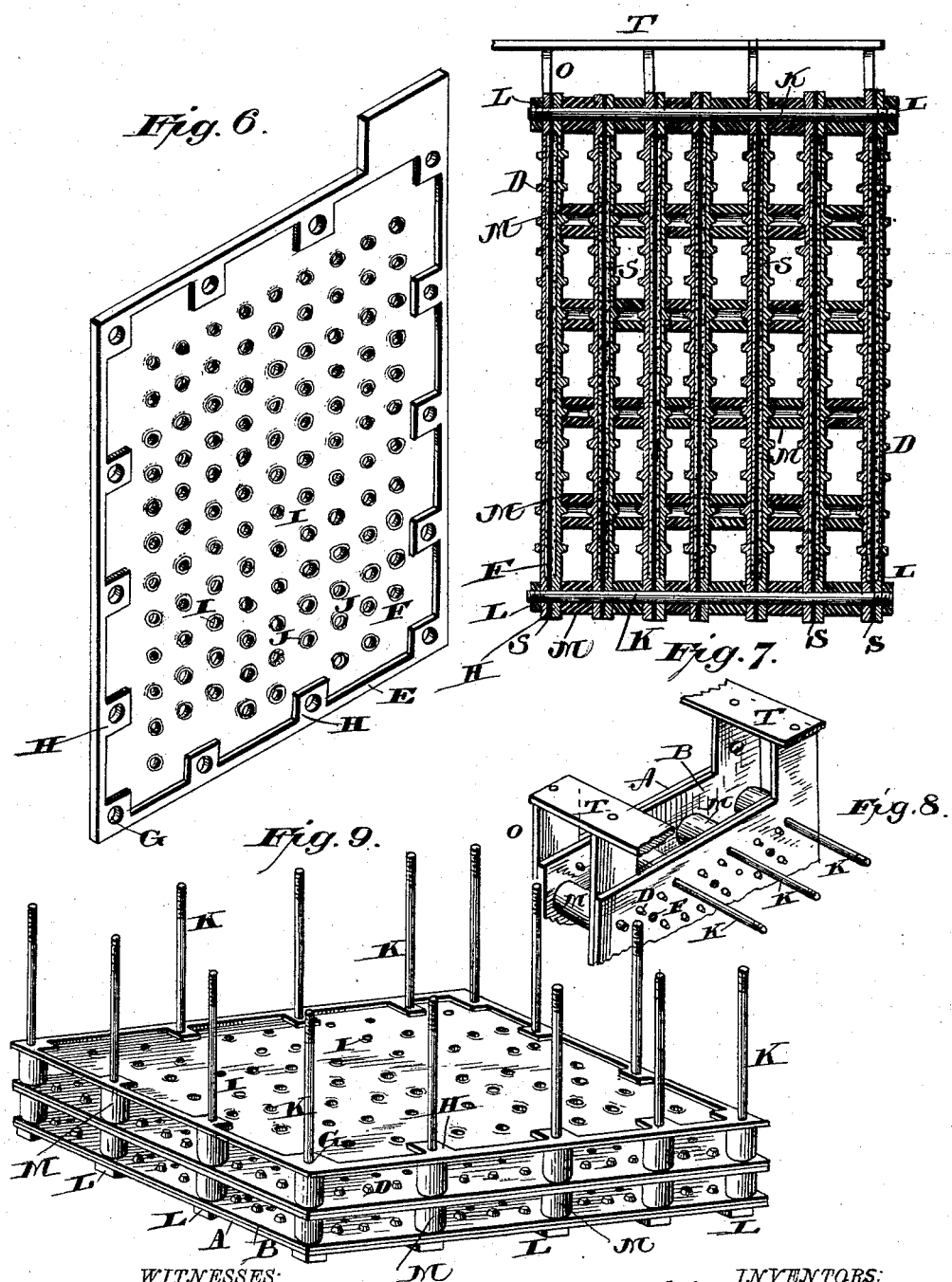
WITNESSES:
INVENTORS:

UNITED STATES PATENT OFFICE.

CHARLES W. KENNEDY AND HENRY GROSWITH, OF PHILADELPHIA, PENNSYLVANIA, ASSIGNORS TO THE KENNEDY-GROSWITH ELECTRIC COMPANY, OF SAME PLACE.

SECONDARY BATTERY.

SPECIFICATION forming part of Letters Patent No. 441,958, dated December 2, 1890.

Application filed April 7, 1890. Serial No. 346,945. (No model.)

*To all whom it may concern:*

Be it known that we, CHARLES W. KENNEDY and HENRY GROSWITH, both residents of Philadelphia, in the county of Philadelphia and State of Pennsylvania, have invented certain new and useful Improvements in Secondary Batteries; and we do hereby declare that the following is a full, clear, and exact description of the invention, which will enable others skilled in the art to which it appertains to make and use the same reference being had to the accompanying drawings, which form a part of this specification, and in which—

Figure 1:
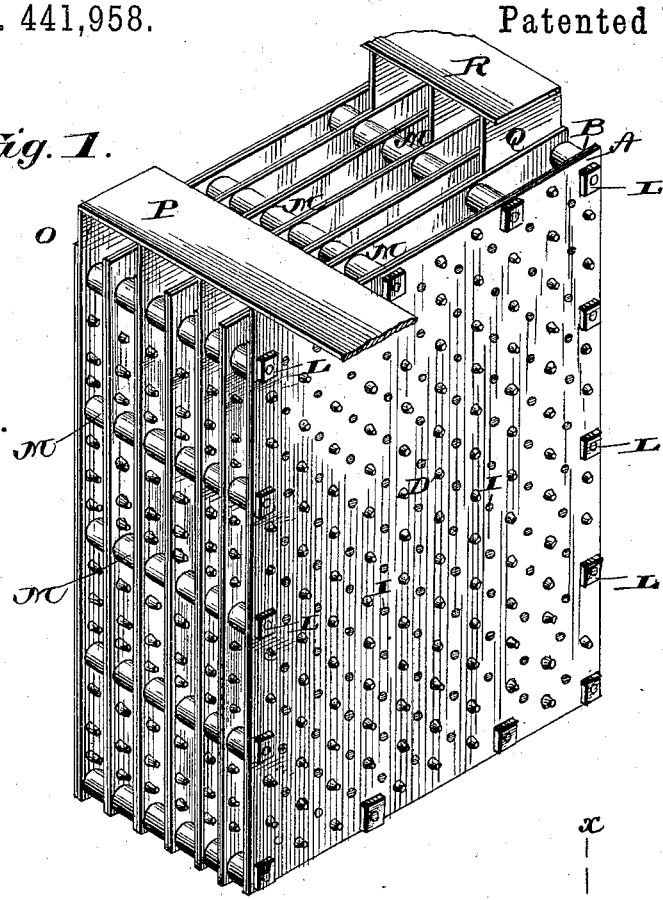
Figure 2:
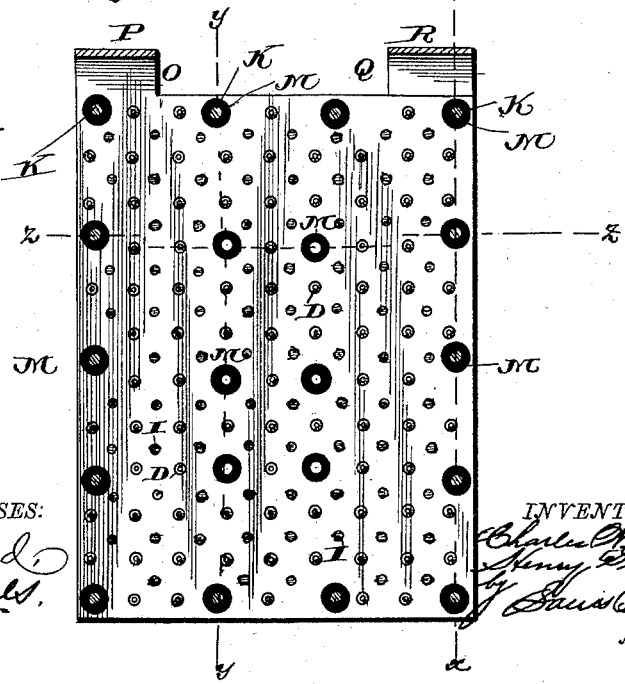

Figure 1 is a perspective view of our secondary battery. Fig. 2 is a longitudinal sectional view of the same on a vertical plane. Fig. 3 is a vertical sectional view on the transverse plane indicated by the broken line marked $x\ x$ in Fig. 2. Fig. 4 is a similar view, but taken on the parallel plane indicated by the line marked $y\ y$. Fig. 5 is a sectional view on the horizontal plane indicated by the line marked $z\ z$. Fig. 6 is a perspective view of the inner side of one of the plates from which the electrodes are built up. Fig. 7 is a sectional view on a transverse vertical plane, illustrating a modified construction of the electrodes which we adopt in building what we term a "double" battery. Fig. 8 is a perspective view of the upper part or portion of one of the electrodes employed in building our double battery, showing the connections on opposite sides of the electrode; and Fig. 9 is a sectional view illustrating the manner of building up the battery from a number of previously-prepared electrode "grids" or plates.

Like letters of reference denote corresponding parts in all the figures.

Our invention relates to electrical secondary or storage batteries of that class or type in which the so-called "active" material is held in place by and between perforated plates or grids made of lead or other suitable material, two of these plates, with the active material between them, constituting one element or "electrode" in the battery; and our improvements have for their object to improve such batteries in the following particulars, viz: to prevent short-circuiting of the battery by the bending or so-called "buckling" of the plates; to make it optional whether to use the active material in a powdered (dry) or in a plastic form; to increase the capacity of the electrodes for active material, and thereby proportionately increase the electrical storage capacity of the battery as a whole; to so construct the electrodes that the inside active material will be retained firmly in its place and prevented from displacement in any direction; to so construct the electrodes that by simply inserting a thin sheet of insulating material between the two plates each pair of plates will form what we term a "double electrode," and, finally, to simplify the construction of the battery as a whole and build up a secondary battery of great storage capacity combined with a minimum of weight.

With these several objects in view our improvements consist, first, in the construction of the elements or electrodes separately considered, and, secondly, in the construction and combination of parts of the complete battery, resulting, as above stated, in the production of a storage-battery wherein the following three important conditions will be found combined in an eminent degree, viz: first, great electrical storage capacity; second, lightness of weight in proportion to the size and capacity of the battery, and, third, durability, simplicity, and cheapness of construction.

On the accompanying three sheets of drawings we have illustrated a battery consisting of seven electrodes, each electrode being composed of two plates or grids, with active material between them; but it is obvious that the number of electrodes may be varied at will and their number either increased or decreased, according to the capacity desired for the battery in any given case. Each electrode is built up of two plates A and B of lead or other suitable material (preferably made by casting in a suitable mold) and an intermediate layer of active material C, which may be litharge, red lead, or minium, or any other material adapted for the purpose, either in a dry or plastic state. The plates or grids A and B being alike, they may be cast in the same mold, each plate being cast on its face or outside with knobs or protuberances D, arranged in parallel rows, and on its inner side, facing the layer of active material, with a raised flange or edge E, so that when the two plates A and B are placed upon each other in building up the electrode a hollow space or chamber F will be formed between them, which is closed on all sides by the inwardly-projecting flanges E and forms a receptacle for the active material C.

The edges of the electrode-plates A and B are cast with registering bolt-holes G, said bolt-holes being re-enforced by a web H, formed by extending the thickened edge or flange E inwardly around them. (See Fig. 6.) Each plate is further provided with rows of apertures I, arranged alternately between the knobs or protuberances D, a portion of the metal which is displaced in drilling these apertures being upset on the inner face of the plate, so as to form a burr or roughened edge encircling each aperture I, as illustrated more clearly at J in Fig. 6. In order to form this boss or burr on the inside of the plate around the apertures I, we prefer to drill said apertures through the plates in pairs by placing two plates A and B upon each other in the same relative position in which they are in the finished electrode—i. e., with their inner flanges E H resting upon or bearing against each other, so as to form a hollow space between the body of the plates—and by now drilling the holes I while the plates are in this position room is left on their inner sides facing each other for the burrs J to be formed around each aperture by the metal which is displaced from the plate in drilling the hole. As these burrs or bosses have an important function, we have been thus particular in describing one way in which they may be formed, although we do not limit ourselves to this or any other particular means or method for forming the apertures or the circumferential burrs on their inner sides.

After the plates or grids A B have been cast, drilled, and finished they are placed in a flat position upon a bench or table, with the flanged side upward, and the shallow chamber or compartment F is packed with the active material—e. g., litharge—either in the form of a dry powder or it may first be made into a paste, if desired. We have found by actual experience that there is no need whatever to pack the plates with the active material (whatever this may be) in a plastic state, and we prefer to use the litharge or minium (or any other suitable material selected for the purpose) in the form of a coarse dry powder; and it is here where the inside burrs or protuberances J come into play, because they serve to retain the powder, so that it will not easily sift out through the apertures in the plates; neither will it (if properly spread and packed in the first instance) become dislodged so as to drop to the bottom of the plates; but it (the active material) will be found to maintain its proper position between the plates, even though the battery be subjected to much jolting and other rough usage—as, for example, when the battery is used as a motor for street-cars over rough and uneven tracks. After the plates have been filled with the tightly packed and compressed active material C the battery is built up as illustrated in the sectional view, Fig. 9—that is to say, we commence by placing the filled bottom plate A flat on the table, inserting a bolt K vertically through each of its re-enforced bolt-holes G, each bolt K having a nut L, of hard rubber or other suitable insulating material. Next the mate B of plate A is placed upon the latter, (all the plates having been first filled with the active material,) but in an inverted position, so that the filling C of the two plates will merge together and form one homogeneous and compact flat body of active material confined in the compartment F between the two flanged and perforated plates A and B, said two plates A and B, constructed as described, with their intermediate filling C, constituting one of our improved electrodes. The next step is to properly space and insulate this first electrode from the one which is to be built adjacent to it, and this we accomplish by placing insulating-washers M upon the knobbed surface of plate B at suitable distances apart from one another. These washers (preferably of hard rubber or vulcanite) are disposed upon the plate around the knobs or protuberances D, so that said knobs will form a central hub or bearing for the washers placed around them. When the third plate A (which is the first plate of the second electrode) is placed in position by slipping it, by means of its bolt-holes G, over and upon the upright bolts K, it will be found that its knobs D, registering with the corresponding knobs of plate B below, will enter the washers M from the other side, said washers being of sufficient depth to prevent the contiguous or opposite points of the knobs, which project into them from opposite sides, from touching each other. Thus it will be seen that in addition to the other functions hereinafter ascribed to them the knobs or protuberances D (which are integral with the plates) operate to hold the insulating and spacing washers M firmly in position between the pairs of plates, preventing them from displacement both in a longitudinal and lateral direction. This process of building up the plates A and B in pairs and separating each pair by the interposed insulating-washers M is repeated until a sufficient number of electrodes have been placed in position to form a battery of the desired capacity, the bolts K serving during this process of building up the battery as guides for the plates A and B as these are successively placed in position in the battery, so that the outwardly-projecting knobs D on adjacent electrodes will be immediately opposite to each other. After the last plate has been placed in position the series of electrodes are bound firmly together, and at the same time the two plates of each electrode are bound firmly together by nuts L, of insulating material, being screwed up upon the projecting threaded ends of the bolts, so as to bind the whole firmly and compactly together, when the battery (after first making the proper connections) is ready for "forming" or charging in the usual well-known manner.

It should have been stated that in building up the battery in the manner described and illustrated on Fig. 9 insulating-washers M are also placed around the bolts K between the electrodes for the purpose of, in conjunction with the washers M around the knobs, properly spacing the electrodes and preventing contact between them.

The connections between the elements of the complete battery are formed in the usual manner by connecting the oxygen elements to one another by means of their tongues O and a connecting-strip P and similarly connecting the hydrogen elements to one another by means of their tongues or extensions Q and a connecting-strip R, the terminal of the strip P forming the anode and that of the connecting-strip R the cathode of the battery.

If it is desired to build what we term a "double" battery, then during the process of building up the battery a thin sheet of hard rubber or other suitable material S is placed between each pair of electrode-plates A and B, (see Figs. 7 and 8,) the insulating-sheet S being clamped firmly between the flanges E of the plates and provided with holes around the edges for the insertion of the binding-bolts K. In that case each plate, instead of each pair of plates, is provided on opposite sides or in opposite corners with its appropriate connecting-tongue T, as in that case one side forms the oxygen and the other the hydrogen element in the electrode, separated from each other by the intermediate insulating plate or diaphragm S. In building this form of battery a different filling of active material is used for each plate of a pair, a filling of red lead being used for the oxygen (anode) side of the electrode, and of litharge for the hydrogen (cathode) side. While this construction of a double battery increases the electrical resistance, yet it will be found to increase the storage capacity and energy of the battery in a still greater ratio, showing a clear gain in energy and storage capacity over a single battery containing the same number of electrodes and of the same weight.

We have already seen that one function of the knobs D, which are cast upon the plates, is to serve as means for retaining the intermediate washers M in place between the electrodes; but, in addition to this, they have other important functions. Thus they increase the superficial area (and consequently the storage capacity) of the plates, and they also effectually prevent contact of the active material in adjacent electrodes, even if the plates should bulge or "buckle" at any point between the intermediate spacing-washers M. If such buckling should take place, it will simply result in the points of the knobs on one plate striking the points of the registering knobs on the plate opposite, so that the flat bodies of the plates cannot touch under any circumstances, nor can the active material of one plate touch that of the adjacent plate, so that short-circuiting between the plates by reason of contact between the active material with which they are respectively charged is impossible. Again, should any of the active material between a pair of electrode-plates escape through the apertures in the plates and run down the outside of the plates it will be intercepted, arrested, and accumulate upon and around these knobs, and thus serve a useful purpose, instead of scaling off and falling to the bottom of the vessel in which the electrodes are immersed.

By making the flanges E thin or narrow around the inner edges of the plates, except where the bolt-holes G pierce the plates, we increase the capacity of the chamber F for active material, the whole inner area being covered with this material, with the exception of the space occupied by the narrow flanges E and re-enforcing webs H surrounding the bolt-holes. This construction also materially reduces the weight of the plates by doing away with all superfluous or non-active metal.

Having thus described our invention, we claim and desire to secure by Letters Patent of the United States—

1. A plate or grid for use in and as a component of the electrodes of a secondary or storage battery, consisting of a plate of lead or analogous material, having outwardly-projecting knobs or projections integral with the plate and arranged in rows or series alternately, with apertures having raised burrs or bosses surrounding them on the inner or smooth side of the plate, substantially as shown and set forth.

2. A plate or grid for use in and as a component of the electrodes of a secondary or storage battery, consisting of a plate of lead or analogous material, having outwardly-projecting knobs or projections integral with the plate, apertures disposed between and alternating with said knobs and having raised burrs or bosses encircling them on the inner side of the plate, and provided on its inner side with a raised flange around the edge, said flange being enlarged laterally or into the body of the plate at the points where the holes for the connecting-bolts pass through the plate, substantially as and for the purpose set forth.

3. An electrode for use in a secondary or storage battery, composed of two perforated plates of lead or analogous material, having outwardly-projecting knobs or studs integral with the plates, and inwardly-projecting annular raised burrs or bosses encircling the perforations and filled with active material confined between the perforated faces of the plates and raised flanges along the inner edges of the plates, substantially as shown and set forth.

4. An electrode for use in a secondary or storage battery, composed of two perforated plates of lead or analogous material, having raised flanges along their inner edges, a partition or diaphragm of insulating material clamped between said flanges and separating the plates, a layer of active "oxygen" material between said insulating-partition and one of the plates, and another layer of active "hydrogen" material between the other side of said insulating-partition and the other perforated plate, substantially as and for the purpose shown and set forth.

5. The combination, in a secondary or storage battery, of the electrodes having integral knobs projecting from their outer surfaces, non-insulating washers disposed between pairs of electrodes around registering knobs, and the bolts and nuts for binding the electrodes together to form the complete battery, substantially as shown and set forth.

6. The combination, in a secondary or storage battery, of the electrodes provided with projecting integral knobs and intermediate non-insulating washers, said knobs projecting into the said washers from opposite sides, whereby they are supported upon and between pairs of electrodes, substantially as described.

In testimony that we claim the foregoing as our own we have hereunto affixed our signatures in presence of two witnesses.

CHARLES W. KENNEDY.
HENRY GROSWITH.

Witnesses:
C. H. COCHRAN,
M. H. RYAN.